United States Patent [19]

Krumm

[11] Patent Number: 4,880,370
[45] Date of Patent: Nov. 14, 1989

[54] EXTRUSION DIE FOR MULTILAYER FOILS OR PLATES OF THERMOPLASTIC SYNTHETIC RESIN

[75] Inventor: Klemens Krumm, Neunkirchen-Seelscheid, Fed. Rep. of Germany

[73] Assignee: Reifenhauser GHBH & Co., Maschinenfabrik, Troisdorf, Fed. Rep. of Germany

[21] Appl. No.: 258,282

[22] Filed: Oct. 14, 1988

[30] Foreign Application Priority Data

Oct. 15, 1987 [DE] Fed. Rep. of Germany ....... 3734883

[51] Int. Cl.4 .............................. B29C 47/06
[52] U.S. Cl. ........................... 425/133.5; 156/244.11; 156/500; 425/462
[58] Field of Search ...................... 425/133.5, 461, 462, 425/131.1; 264/177.16; 156/244.11, 244.12, 500, 501

[56] References Cited

U.S. PATENT DOCUMENTS

| | | | |
|---|---|---|---|
| 2,761,417 | 9/1956 | Russell et al. | 425/133.5 X |
| 3,005,440 | 10/1961 | Padday | 425/133.5 X |
| 3,547,682 | 12/1970 | Erb | 425/133.5 X |
| 3,559,239 | 2/1971 | Work et al. | 425/133.5 |
| 3,583,032 | 6/1971 | Stafford | 425/133.5 |
| 3,884,606 | 5/1975 | Schrenk | 425/133.5 |
| 4,094,947 | 6/1978 | Alfrey, Jr. et al. | 425/131.1 X |
| 4,137,027 | 1/1979 | Ruger | 425/462 X |
| 4,329,133 | 5/1982 | Gallizia | 425/461 X |
| 4,669,965 | 6/1987 | Murakami | 425/133.5 |

FOREIGN PATENT DOCUMENTS 1590375 5/1970 France ............... 425/133.5

*Primary Examiner*—Richard L. Chiesa
*Attorney, Agent, or Firm*—Herbert Dubno

[57] ABSTRACT

An extrusion die for the extrusion of a multilayer thermoplastic foil or plate in which a stack of die plates is provided and each plate has an inlet fitting on a respective side of the rectangular outline of the die connected to a respective extruder and a broadening channel opening at an outlet along another edge of the respective plate. The outlets are located on the same side of the stack and open into a common die lip from which the multilayer extrusion emerges at an elongated slit for the broad-mouth die. The broadening channels of the upper and lower plates are sickle shaped and extend inwardly from the respective inlets mirror-symmetrically to receive a median plane along which the inlet of the broadening channel of the central plate is provided.

10 Claims, 2 Drawing Sheets

EXTRUSION DIE FOR MULTILAYER FOILS OR PLATES OF THERMOPLASTIC SYNTHETIC RESIN

FIELD OF THE INVENTION

My present invention relates to an extrusion die for the production of relatively flat thin extrusions or workpieces from thermoplastic synthetic resins and, more particularly, to an apparatus for producing multilayer foils or plates by extrusion.

BACKGROUND OF THE INVENTION

It is known to use so-called broad-slit or wide-mouth dies for the extrusion of thermoplastic synthetic resins in the formation of relatively thin and relatively wide workpieces or extrusions and, in the case in which a multilayer foil or plate is desired, to connect two or more extruders to the die so that the respective flow passages merge at the die orifice or lip which is relatively narrow and elongated to extrude the flat thin workpiece.

Between the inlets from the extruders on the die and the elongated orifice, spreading channels can be provided so that the thermoplastic synthetic resin flow can spread out and uniformly reach the die orifice or lip.

Usually the extruders are connected by respective fittings to the inlets, these fittings having axes. The individual layers of the thermoplastic synthetic resin forming the extrusion can be constituted from the same plastic material which can be modified from one layer to the other or not, e.g. by foaming one of the layers, or from different synthetic resins.

Generally all of the axes of the inlet orifices are located in a longitudinal median plane and thus at a midpoint of the extrusion die, one above another. The extrusion die is generally fabricated from a number of parts and, because of the location of the fittings, assembly may be complex or the die may have to be of very complicated construction.

Since all of the inlet fittings are customarily located at the front side of the die block opposite the die outlet orifice, it is rather complex to connect the extruder units to the fittings. Worm-type extrusion presses are relatively long and massive and would tend to interfere with one another if they were connected directly to the fittings. Accordingly, it was customary to connect the extruders by long pipelines which may have bends or the like in them. This, of course, is a costly construction, makes cleaning and maintenance difficult and expensive and requires heating of long stretches of pipe. It will be understood that most of the paths of the thermoplastic, until the extrusion emerges from the dies, require heating.

It is not possible, therefore, with earlier constructions as described, to directly connect the extrusion presses to the die.

OBJECTS OF THE INVENTION

It is, therefore, the principal object of the present invention to provide an extrusion die for the purposes described which can simplify connection of worm-type extrusion presses thereto and which eliminates the need for arcuate connecting pipes or the like and which especially permits all extrusion presses to be connected directly to the extrusion block.

Another object of this invention is to provide a relatively simple, easily maintained and easily manufactured extrusion die for the purposes described.

Yet another object of this invention is to provide an extrusion die and an extrusion apparatus which permits multilayer foils and plates to be fabricated from thermoplastic synthetic resin of high quality and with high precision.

SUMMARY OF THE INVENTION

These objects and others which will become apparent hereinafter are attained, in accordance with the invention which provides that the extrusion die is constituted as a stack of die plates equal in number to the number of layers of synthetic resin to be provided in the extruded article.

Each of these die plates has an inlet on one side, an outlet on another side or edge of the plate, and a broadening channel, extending from the inlet to the outlet and widening in the direction of the latter for spreading the flow of a respective thermoplastic synthetic resin thereto.

The outlets of the plates are located along a common side of the stack or block formed from the plates and each inlet is associated with a fitting to which an extruder is directly flanged along an axis. The extruder and fitting axis can include angles of at least 45° with one another.

The outlets at the common side of the block all communicate with a common orifice slit from which the extrusion emerges.

In an embodiment of the invention in which the stack has a projection in a plane perpendicular to the median plane and parallel to the extrusion, the fittings can be provided on different sides of the rectangular outline. Indeed, it is also possible to provide each connecting fitting so that it receives a plurality of synthetic resin flows.

In a preferred embodiment of the invention the broadening channels in the die plates are defined by walls which extend more or less parabolically from the inlet to the outlet and narrow in this direction. The upper and lower walls extend mirror symmetrically with respect to the median plane and have the configuration of sickles, i.e. are oppositely sickle shaped while the central die plate between these upper and lower die plates has its broadening channel formed in the configuration of a "clothes hanger".

Of course, while extrusion plates are referred to here as units, it will be understood that they also may be composed or assembled from a number of parts.

The extrusion apparatus of the invention thus can be constituted of:

an extrusion die comprising:

a plurality of die plates in stacked relationship, each of the die plates being formed with an inlet at one edge of the respective die plate, an elongated outlet along another edge of the die plate, and a flow-spreading channel communicating between the inlet and the outlet and widening in the direction of the outlet, the outlets of the die plates all lying along a common side of a stack formed by the plates;

means forming an elongated extrusion orifice for issuing a relatively wide and thin extrusion connected to the common side of the stack and receiving thermoplastic synthetic resin from the outlets whereby the thermoplastic synthetic resin from the outlets forms layers in the extrusion; and respective connecting fittings communicating with the inlets; and a respective extruder connected to each of the fittings for feeding a respective thermoplastic through the respective die plate to the respective outlet.

The invention utilizes the fact that under the conditions described, the three flows of thermoplastic synthetic resin can cross one another within the die body without hydrodynamic disturbances to one another because of the manner in which the channels widen, thereby reaching the common orifice in uniform layers so that the extrusion itself is uniform. The die body itself can be fabricated simply and mounted or dismounted without difficulty.

Even the largest worm-type extrusion presses can be joined easily to the die and arcuate pipelines can be eliminated altogether. Indeed, the presses can be directly flanged to the die body or stack.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1C:
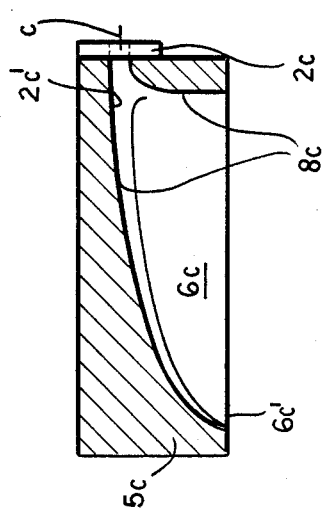
FIGS. 1A, 1B and 1C are horizontal sections through respective die plates adapted to be assembled into a stack and showing how the respective fittings, inlets and outlets relate to one another.
Figure 1B:
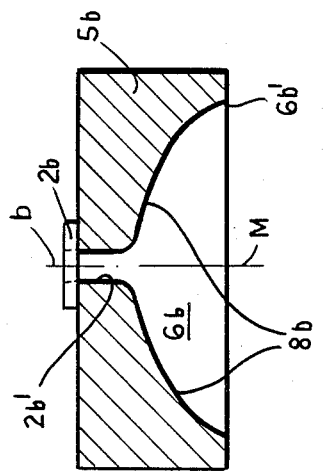
Figure 1A:
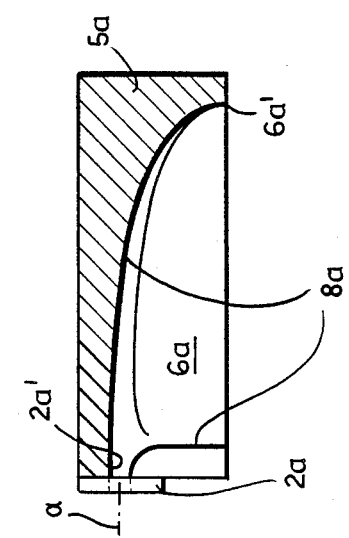

FIG. 1A shows the lower die plate 5a in a horizontal cross section with its flange fitting 2a being illustrated in elevation and aligned with an inlet 2a' and opening into a broadening channel 6a extending to an outlet 6a' along an edge of the plate 5a. The walls 8a define a sickle shape bending to the right and the longer wall is generally parabolic in configuration. The axis of the inlet is shown at a and projects perpendicular to the left side of the plate 5a which has a rectangular outline.

The plate 5b of the central member of the die has its inlet 2b' located along the vertical median plane M of the die and is of the same rectangular outline as the plate 5a. The fitting 2b is here located on the longer side or edge of this plate and both walls 8b of the widening channel 6b are generally parabolic. The channel opens at an outlet 6b' along the opposite edge of the plate.

The upper die plate 5c is mirror symmetrical with respect to the die plate 5a in that it has an inlet 2c' located along the right-hand edge of the plate in line with a fitting 2c whose axis c is located in line with the axis a but mirror symmetrically with respect to the median plane M which extends along the axis b of the inlet 2b' and the fitting 2b. The walls 8c have a sickle shape extending to the left and define a broadening channel 6c which opens at an outlet 6c'. The channels 6a and 6c narrow respectively to the right and to the left, i.e. mirror symmetrically with respect to the median plane M.

Figure 2:
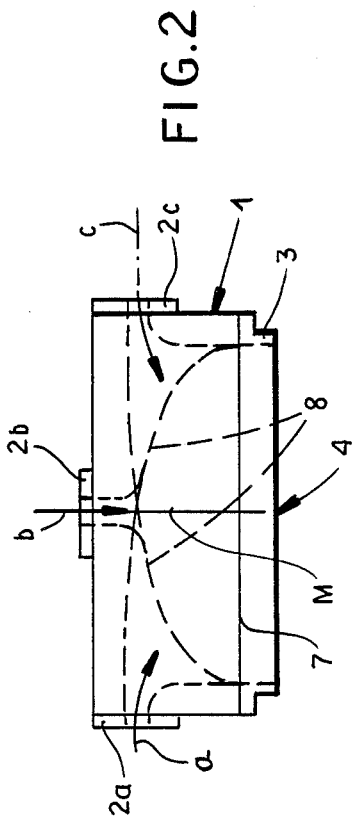
FIG. 2 is a plan view of the die showing the stack and the die lip formed with its orifice.
Figure 5:
FIG. 5 is a cross sectional view through a three-layer plate as extruded by the apparatus of FIGS. 3 and 4.

When these plates are stacked to form the extrusion die 1 seen from above in FIG. 2, they can be held together by vertically extending bolts (not shown) or other clamping means. The extrusion die can be used for the extrusion of a foil or plate of thermoplastic synthetic resin as can be seen from FIG. 5. This plate or foil 10 comprises an upper layer 11 contributed by the die plate 5c, a central layer 12 contributed by the die plate 5b and a lower layer 13 contributed by the die plate 5a. The extruded foil or plate emerges from a die lip or broad-slit nozzle 3 through an outlet represented at 4 and seen in cross section in FIG. 7.

Figure 3:
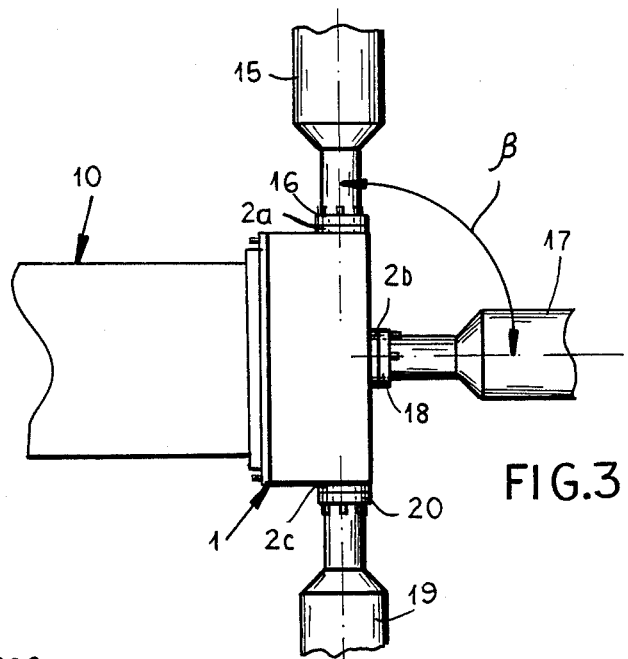
FIG. 3 is a plan view of the apparatus diagrammatically showing respective extruders connected to the inlet fittings.

It will be apparent that the individual die plates contribute respective flows of synthetic resin to the layers of the three-layer extrusion which is produced. The axes a, b and c constitute axes along which respective extruders can be affixed as has been shown in FIG. 3. Here the extrusion die 1 is seen to have a first extruder 15 directly flanged to the fitting 2a by a flange connection 16 while an extruder 17 is directly flanged to the fitting 2b via its flange connection 18. The third extruder 19 is directly flanged to the fitting 2c by its flange connection 20 and the axes of the extruders and the fittings form angles β between them where β is at least 45°. As is clear from FIGS. 2 and 3, the die stack has a rectangular outline and the three extruders are flanged along respective sides of the rectangle while the extruded workpiece 10 emerges from the fourth side.

Figure 4:
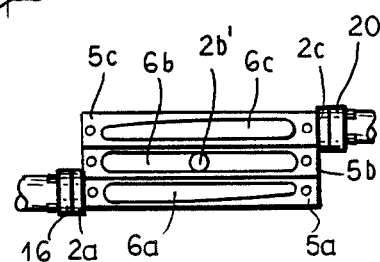
FIG. 4 is an end view of the stack with the die lip removed.
Figure 6:
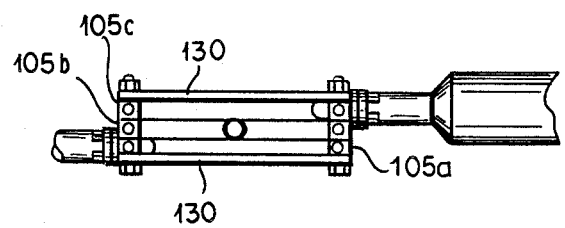
FIG. 6 is a view similar to FIG. 4 but illustrating an embodiment wherein separating walls between the channels are eliminated.

It will be apparent from FIG. 4 that the extruders are connected to the respective plates 5a, 5b and 5c with their broadening channels 6a, 6b and 6c at different levels as well. In this embodiment, the channels 6a, 6b and 6c are separated from one another by walls of the plates, thereby separating the respective streams until they merge in the lie lip 3. However, in the embodiment of FIG. 6, the walls separating the channels have been omitted and here the plates 105a, 105b and 105c can open directly to one another, the top and bottom of the die being closed by additional plates 130.

Any intermediate arrangement can be used as well, i.e. the walls separating the broadening channels may be foreshortened so that the streams merge before they reach the die lip 3.

Figure 7:
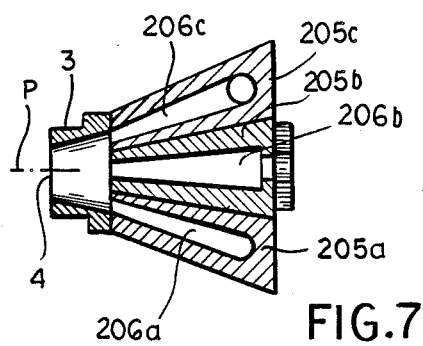
FIG. 7 is a cross-sectional view taken along a longitudinal median plane through a rectangular outline die body or stack showing another embodiment of the invention.

In the embodiment of FIG. 7, I have shown an arrangement in which the broadening channels extend in inclined planes. For example, the central plate 205b has inclined upper and lower surfaces against which inclined plates 205a and 205c are held so that the respective channels 206a and 206c and the respective flows converge toward the flow from the central channel 206b.

Here as well the stack has a rectangular projection on a plane P corresponding to the plane of extrusion The synthetic resin streams in all embodiments can be of the same or different synthetic resins as noted.

I claim:

1. An extrusion die for the extrusion of a multilayer extrusion of thermoplastic synthetic resin, comprising:
   a plurality of die plates in stacked relationship, each of said die plates being formed with an inlet at one edge of the respective die plate, an elongated outlet along another edge of the die plate, and a flow-spreading channel communicating between said inlet and said outlet and widening in the direction of said outlet, said outlets of said die plates all lying along a common side of a stack formed by the plates;

means forming an elongated extrusion orifice for issuing a relatively wide and thin extrusion connected to said common side of said stack and receiving thermoplastic synthetic resin from said outlets whereby the thermoplastic synthetic resin from said outlets forms layers in said extrusion; and respective means at each of said inlets for connecting a respective extruder to the respective die plate for feeding a respective thermoplastic therethrough to the respective outlet, said stack including two die plates having fittings disposed symmetrically to opposite sides of a median plane through said stack perpendicular to said extrusion and said channels of said two die plates defined by walls extending mirror symmetrically and parabolically from the respective inlet to the respective outlet.

2. The extrusion die defined in claim 1 wherein said means for connecting respective extruders to said die plates includes a respective said fitting opening into each of said inlets and having an axis, said axes including an angle of at least 45°.

3. The extrusion die defined in claim 2 wherein said stack has a rectangular outline in projection on a plane parallel to said extrusion, said fittings being located on different sides of said outline.

4. The extrusion die defined in claim 1 wherein said stack includes a further die plate located between said two die plates and having a respective said inlet and said fitting lying along said median plane.

5. The extrusion die defined in claim 1 wherein said channel of said further die plate has the configuration generally of a clothes hanger and the channel of each of said two plates is generally sickle shaped.

6. An extrusion apparatus for the extrusion of a multilayer extrusion of thermoplastic synthetic resin, comprising:

an extrusion die comprising:

a plurality of die plates in stacked relationship, each of said die plates being formed with an inlet at one edge of the respective die plate, an elongated outlet along another edge of the die plate, and a flow-spreading channel communicating between said inlet and said outlet and widening in the direction of said outlet, said outlets of said die plates all lying along a common side of a stack formed by the plates;

means forming an elongated extrusion orifice for issuing a relatively wide and thin extrusion connected to said common side of said stack and receiving thermoplastic synthetic resin from said outlets whereby the thermoplastic synthetic resin from said outlets forms layers in said extrusion; and respective connecting fittings communicating with said inlets, said stack including two die plates having said fittings disposed symmetrically to opposite sides of a median plane through said stack perpendicular to said extrusion and said channels of said two die plates defined by walls extending mirror symmetrically and parabolically from the respective inlet to the respective outlet; and a respective extruder connected to each of said fittings for feeding a respective thermoplastic through the respective die plate to the respective outlet.

7. The extrusion apparatus defined in claim 6 wherein said fittings have respective axes, said axes including an angle of at least 45°.

8. The extrusion apparatus defined in claim 7 wherein said stack has a rectangular outline in projection on a plane parallel to said extrusion, said fittings being located on different sides of said outline.

9. The extrusion apparatus defined in claim 6 wherein said stack includes a further die plate located between said two die plates and having a respective said inlet and said fitting lying along said median plane.

10. The extrusion apparatus defined in claim 8 wherein said channel of said further die plate has the configuration generally of a clothes hanger and the channel of each of said two plates is generally sickle shaped.

* * * * *